United States Patent
Takei et al.

(10) Patent No.: US 8,611,761 B2
(45) Date of Patent: Dec. 17, 2013

(54) METHOD TO CONTROL TEMPERATURE OF LD

(75) Inventors: Ryutaro Takei, Yokohama (JP); Takeshi Irie, Yokohama (JP); Tomoki Ito, Yokohama (JP); Kazuhisa Ozaki, Yokohama (JP); Masatsugu Togasaki, Yokohama (JP)

(73) Assignee: Sumitomo Electric Device Innovations, Inc., Kanagawa (JP)

(*) Notice: Subject to any disclaimer, the term of this patent is extended or adjusted under 35 U.S.C. 154(b) by 234 days.

(21) Appl. No.: 12/984,095

(22) Filed: Jan. 4, 2011

(65) Prior Publication Data
US 2011/0164885 A1    Jul. 7, 2011

(30) Foreign Application Priority Data

Jan. 5, 2010 (JP) ................... 2010-000729

(51) Int. Cl.
*H04B 10/00* (2013.01)
*H04B 10/50* (2013.01)

(52) U.S. Cl.
CPC ................ *H04B 10/503* (2013.01)
USPC ........................................ 398/197

(58) Field of Classification Search
USPC ........................................ 398/197
See application file for complete search history.

(56) References Cited

U.S. PATENT DOCUMENTS 7,056,035 B2 * 6/2006 Iida et al. ............ 385/92
7,269,192 B2 * 9/2007 Hayashi ............ 372/34

FOREIGN PATENT DOCUMENTS

| JP | 2003-198041 | 7/2003 |
| JP | 2004-304607 | 10/2004 |
| JP | 2005-197984 | 7/2005 |

* cited by examiner

*Primary Examiner* — Danny Leung
(74) *Attorney, Agent, or Firm* — Smith, Gambrell & Russell, LLP

(57) ABSTRACT

New method to control the optical transmitter is disclosed. The optical transmitter provides both of the ATC feedback loop and the APC feedback loop. When a failure occurs in the ATC feedback loop and the temperature sensor is unable to output an adequate signal any longer, the optical transmitter cuts the APC loop and operates the LD in constant conditions. The output of the monitor PD is transferred to the ATC loop to control the TEC based on the optical output of the LD.

9 Claims, 2 Drawing Sheets

METHOD TO CONTROL TEMPERATURE OF LD

BACKGROUND OF THE INVENTION

1. Field of the Invention

The present invention relates to a method to control a temperature of a laser diode (hereafter denoted as LD), in particular, the invention relates to a method to control a temperature of the LD when a failure occurs in a temperature sensor.

2. Related Prior Art

Various methods to set the optical output from an optical transmitter in stable have been known. Japanese Patent Application published as JP-2005-197984A has disclose an optical transmitter implemented with functions to keep the optical output of the LD in constant even an ambient temperature of the LD varies and to compensate the time degradation of the LD. The optical transmitter disclosed therein provides a look-up table that stores a set of driving currents for the LD each reflecting the temperature dependence of the LD, a differential circuit that compares the optical output of the LD with a reference level, a temperature sensor to sense the ambient temperature, a detector to detect a loss of the input signal, and a processor. The transmitter evaluates the degradation of the LD based on the bias current currently provided thereto, the ambient temperature and the current output of the LD; and may keep the optical output of the LD in constant.

Another prior patent, U.S. Pat. No. 7,056,035, has disclosed another method to maintain the optical output level of the LD and its output wavelength precisely in a long term. The optical transmitter disclosed therein is a type of, what is called as the external modulator, and provides an LD unit an external modulator, a unit of the auto-power control (hereafter denoted as APC) for the LD, an auto-wavelength control (hereafter denoted as AWC), an APC for the modulator, and a controller. The APC-LD unit controls the output of the LD in constant, while the APC-TX unit controls the output of the modulator in constant. The AWC maintains the wavelength of light output form the LD to a preset wavelength by adjusting a temperature of the LD. In a normal mode, the APC-LD control and the AWC control are independently and concurrently carried out as detecting a difference between the output power of the modulator and the preset reference. When this difference becomes larger than a critical level, the target power of the LD is changed.

Still another Japanese Patent Application published as JP-2003-198041A has disclosed a method to prevent an excess current flowing in a thermo-electric controller (hereafter denoted as TEC). The LD module disclosed therein estimates a maximum allowed current supplied to the TEC at which the temperature of the LD becomes less than the allowed highest temperature based on an ambient temperature and the driving current provided to the LD. The controller suppresses the current provided to the TEC less than thus evaluated maximum current.

However, such optical transmitters disclosed in those prior patent require a temperature sensor, typically a thermistor, to sense the temperature of the LD. When a failure occurs in this sensor, or interconnections to the sensor break, the transmitter could not control the optical output of the LD any longer. The present invention provides an optical transmitter able to keep the optical output thereof even when the temperature thereof becomes impossible to be adequately detectable.

SUMMARY OF THE INVENTION

An aspect of the present invention relates to a method to control an optical transmitter that provides both of an auto-temperature controlling (hereafter denoted as ATC) loop and an auto-power controlling (hereafter denoted as APC) loop. The method has a feature that, when an extraordinary occurs in the auto-temperature controlling loop, (1) the auto-power controlling loop changes to the open loop mode wherein the LD is driven by a steady condition just before the extraordinary in the auto-temperature controlling loop occurs; (2) monitoring the optical output of the LD driven under the steady condition and transferring the monitored optical output to the auto-temperature controlling loop; and the thermo-electric controller that controls a temperature of the LD base on thus transferred optical output of the LD.

Another aspect of the present invention relates to a configuration of an optical transmitter that includes both of an auto-temperature controlling loop and an auto-power controlling loop. The ATC loop includes a temperature sensor, a temperature controller, a TEC driver, and a TEC in this order, while, the APC loop includes a monitor PD, a power controller, an LD driver, and an LD in this order. The temperature controller controls a temperature of the LD by comparing an output of the temperature sensor with a first reference and outputting a control signal so as to set the temperature of the LD substantially equal to a target temperature corresponding to the first reference. The power controller controls a magnitude of the optical output of the LD by comparing an output of the monitor PD with a second reference and outputting a control signal so as to set the optical output of the LD substantially equal to the target power corresponding to the second reference. A feature of the optical transmitter of the invention is that, when the temperature sensor fall in an extraordinary, the APC loop changes in the open mode by driving the LD in a steady condition which is set just before the extraordinary occurs, the output of the monitor PD is transferred to the temperature controller, and the temperature controller drives the TEC driver without comparing the output of the temperature sensor with the first reference.

BRIEF DESCRIPTION OF DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS

Next, some preferred embodiments according to the present invention will be described as referring to accompanying drawings. In the description of the drawings, the same or the like numerals and symbols will refer to the same or the like elements without overlapping explanations.

Figure 1:
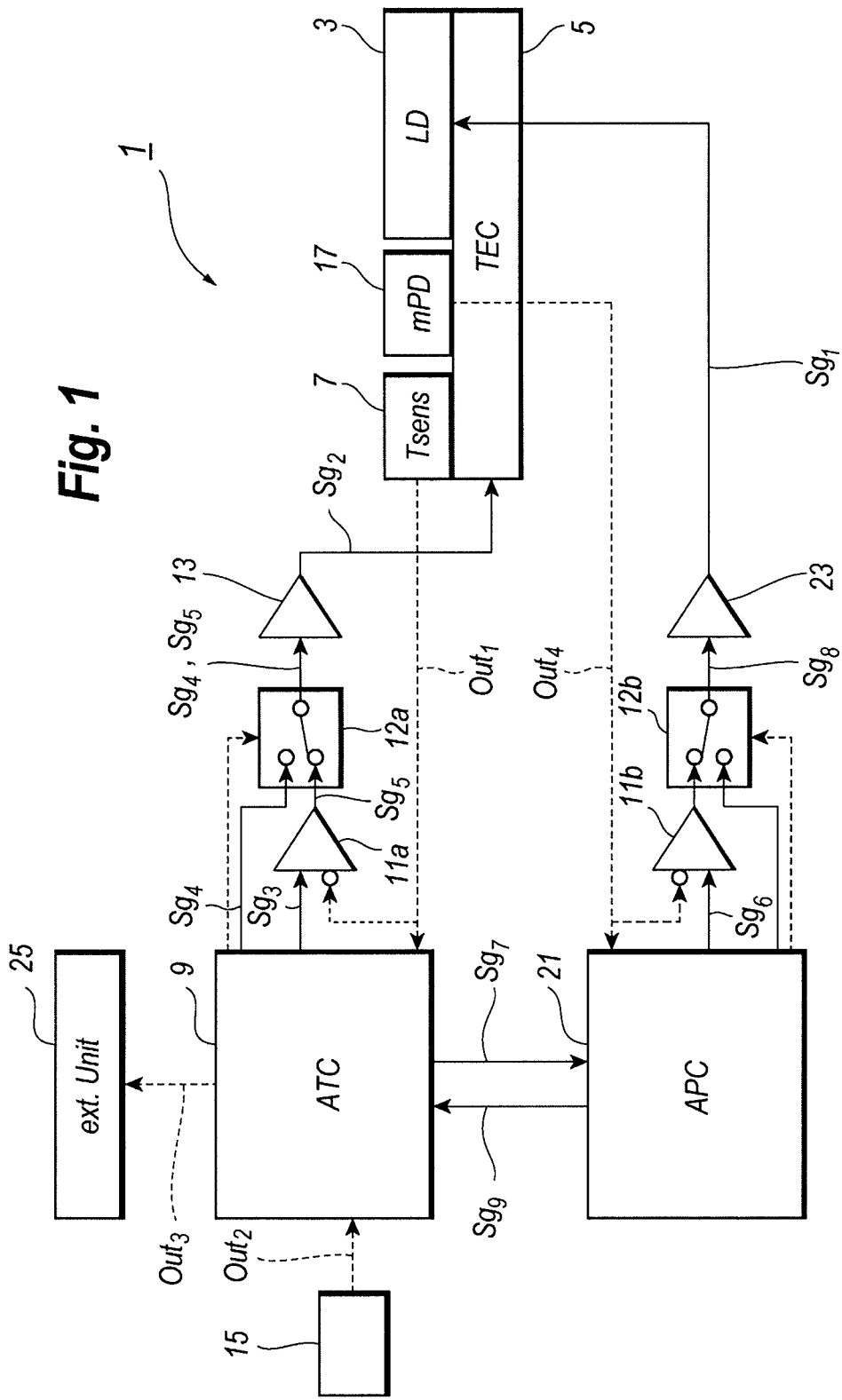
FIG. 1 is a block diagram of the optical transmitter according to the first embodiment of the present invention.

FIG. 1 is a block diagram of an optical transmitter 1 according to one embodiment of the present invention. The optical transmitter 1 comprises an LD 3, a TEC 5, a temperature sensor 7, an ATC 9, two comparators, 11a and 11b, two switches, 12a and 12b, a TEC driver 13, a monitor PD (hereafter denoted as mPD) 17, an APC 21 and an LD driver 23. The optical transmitter shown in FIG. 1 is applicable to the DWDM (Dense Wavelength Division Multiplexing) optical communication system.

The optical output of the LD 3, specifically, the average and the maximum magnitude thereof, depends not only on the signal $Sg_1$ provided from the LD driver 23 but an operating temperature of the LD 3. When the operating temperature of the LD 3 is kept between 25 to 55° C. and electrical conditions are kept constant within the temperature range above, the optical output of the LD generally shows a temperature dependence of −3.5%/° C. Increasing the temperature of the LD 3, not only the absolute magnitude of the optical output of the LD 3 but the emission efficient thereof decreases, where the emission efficiency means a variation of the magnitude of the optical output when the driving current is changed by a unit value, which is often called as the slope efficiency. Accordingly, the optical transmitter 1 provides the TEC to keep the operating temperature of the LD 3 within a preset range.

The TEC 5, the temperature sensor 7, the ATC 9, the first comparator 11a, the first switch 12a, and the TEC driver 13 constitute the first feedback loop, which is called as the ATC loop. The ATC loop electrically couples the temperature sensor 7, the comparator 11a, the switch 12a, the TEC driver 13, and the TEC 5 in this order with each other. The ATC loop may set the temperature of the LD 3 which is indirectly sensed by the temperature sensor 7 so as to be within a preset range around a target temperature which is set in one of inputs of the comparator 11a and provided from ATC 9. The TEC 5 may include Peltier elements which may cool down or heat up the temperature of the LD 3 depending on the current signal $Sg_2$ provided from the TEC driver 13. The temperature sensor 7 may be a thermistor which is placed in a vicinity of the LD 3 on the top plate of the TEC 5. The LD 3 may emit light responding on the signal $Sg_1$ provided from the LD driver 23.

The ATC 9 outputs the signal $Sg_3$ to the comparator 11a. As described above, the signal $Sg_3$ corresponds to the target temperature of the LD 3, and the ATC loop operates such that the signal $Out_1$ output from the temperature sensor 7 becomes substantially equal to the reference $Sg_3$, that is, two inputs, $Sg_3$ and $Out_1$, of the comparator 11a becomes equal to the each other. The output $Sg_5$ of the comparator 11a is provided to the TEC driver 13 through the switch 12a. The switch 12a normally connects the output of the comparator 11a with the TEC driver 13 as far as any failures are detected in the temperature sensor 7. An extraordinary where the switch 12a connects the output of the ATC 9 to the TEC driver 13 will be described later.

The TEC driver 13, by receiving one of the output $Sg_5$ of the comparator 11a or that $Sg_4$ of the ATC 9, which are generally voltage signals, converts these voltage signals into a current signal $Sg_2$ and provides it to the TEC 5. The current signal $Sg_2$ reaches or sometimes exceeds one ampere when the TEC 5 is necessary to compensate several tense of temperature difference; accordingly, the comparator 11a is generally unable to driver the TEC 5 directly. A comparator integrated with a current buffer able to output a large current, the comparator may directly drive the TEC 5.

When the operating temperature of the LD 3 increases and the performance of the LD 3 degrades, the APC loop, which will be described later, increases the driving current provided to the LD 3 to keep the optical output of the LD 3 in constant. The increase of the driving current raises the temperature of the LD 3. The temperature sensor 7 may sense this increase of the operating temperature of the LD 3 and the ATC loop sets the current signal $Sg_2$ for the TEC greater to enhance the cooling down performance of the TEC 5. On the other hand, when the operating temperature of the LD 3 decreases, the ATC loop may sense this temperature decrease and sets the current signal $Sg_2$ provided to the TEC 5 smaller, which sets the performance of the TEC 5 weakened.

Thus, the ATC loop may control the temperature of the LD 3 within a preset range around the target temperature $Sg_3$. The closed loop gain of the ATC loop may determine the preset range. A large closed loop gain means that the current $Sg_3$ provided to the TEC 5 from the TEC driver 13 becomes larger with respect to a temperature variation sensed by the temperature sensor 7. On the other hand, setting the closed loop gain smaller, the ATC loop may stably operate but the preset range above expands.

The optical transmitter 1 according to the present embodiment further provides, in addition the ATC loop described above, the second feedback loop called as the APC loop, which is constituted by the LD 3, the mPD 17, the second comparator 11b, the second switch 12b, the APC 21, and the LD driver 23, each electrically connected in this order. The mPD 17 detects a portion of light emitted from the LD 3 and provides a signal $Out_4$ reflecting the magnitude of the detected light to the comparator 11b. The comparator 11b compares this output $Out_4$ with a reference $Sg_6$ provided from the APC 21, and provides an output $Sg_8$ to the LD driver 23 such that two signals, $Out_4$ and $Sg_6$, becomes substantially equal to the others. The switch 12b normally connects the output $Out_4$ of the comparator 11b with the LD driver 23. The LD driver 23 provides the signal $Sg_1$, which is a driving signal for the LD 3 and corresponding to the control signal $Sg_8$, to the LD 3. The output $Sg_8$ of the comparator 11b is generally a type of voltage signal, while, the driving signal $Sg_1$ for the LD 3 is a type of current signal. When the comparator 11b may output a current signal, the LD driver 23 may be omitted and the LD 3 may be directly driven by the comparator 11b. The reference $Sg_6$ provided by the APC 21 corresponds to a target magnitude of the optical output of the LD 3 at a preset temperature. Accordingly, the APC loop described above may keep the magnitude of the optical output of the LD 3 substantially in constant around the target magnitude.

Next, an operation of the optical transmitter 1 according to the present embodiment will be described. The optical transmitter 1 provides the output $Out_4$ of the mPD 17 not only to the comparator but to the APC 21. The APC 21 holds a newest output of the mPD 17 by regularly monitoring it. Moreover, the output of the temperature sensor 7 is provided not only to the comparator 11a but to the ATC 9.

When the ATC loop is operated normally; the ATC loop may control the temperature of the LD 3, exactly the temperature of the TEC 5, within a preset range around the target temperature. However, once the ATC loop falls in irregular, in particular, the temperature sensor 7 falls in an extraordinary, which is the subject of the present invention, the temperature of the LD 3 becomes unable to be held within the preset range any longer and the TEC 5 sometimes receives an excess driving current which may break the TEC 5. For instance, when the lead drawn out from the temperature sensor 7 is broken, which opens the ATC loop, the TEC 5 is impossible to be adequately driven whatever components within the ATC loop are regularly operated.

The optical transmitter 1 according to the present embodiment the ATC 9 regularly takes the output $Out_1$ of the temperature sensor 7, which enables to detect an extraordinary of the temperature sensor 7 and that in the ATC loop. For instance, when the lead drawn from the temperature sensor 7 is broken, the output of the temperature sensor 7, which is the input of the ATC 9, is pulled up or down and a large difference appears between the reference $Sg_3$ and the pulled up/down output of the temperature sensor 7. Or, the optical transmitter 1 may install another temperature sensor 15 to monitor an ambient temperature within the transmitter 1 as shown in FIG. 1 in addition to the temperature sensor 7 to detect the temperature of the TEC 5. Comparing the output $Out_2$ of this second temperature sensor with the output $Out_1$ of the first temperature sensor 7, the transmitter 1 may decide that the ATC loop falls in an extraordinary.

Detecting a failure in the ATC loop, the ATC 9 operates as follows: that is, the ATC 9 sets the switch 12a from the state where the output of the comparator 11a is provided to the TEC driver 13 to the other state where the output $Sg_4$ of the ATC 9 is provided to the TEC driver 13. Moreover, the transmitter 1 not only provides a status signal $Sg_7$, which shows a occurrence of a failure in the ATC loop, to the APC 21 but an error signal $Out_3$ that indicates the failure is output to the external unit 25.

The APC 21, when it receives the status signal $Sg_7$, changes the switch 12b from the state where the output of the comparator 11b is provided to the LD driver 23 to the other state where the APC 21 directly drives the LD driver 23. The output of the APC 21 provided to the LD driver 23 traces a level which the mPD 17 outputs to the second comparator 11b just before the changing of the switch 12b. The APC 21 always monitors the output $Out_4$ of the mPD 17 and holds the monitored value. The change of the switch 12b to the direct driving mode for the LD driver 23 means that the LD 3 is driven in the open loop mode in a constant condition. Accordingly, the magnitude of the optical output of the LD 3 fluctuates depending on the temperature thereof by the rate of −3.5%/° C. The mPD 17 detects this fluctuation and the ATC 21 transfers the fluctuation to the ATC 9 by the signal $Sg_9$.

The ATC 9, responding to the signal $Sg_9$ provided from the APC 21, controls the TEC-Drier 13 by the signal $Sg_4$ that defines the temperature through the switch 12a, and the TEC driver/3 controls the TEC 5 by the current signal $Sg_2$ that corresponds to the signal $Sg_4$. Thus, the operation of the optical transmitter 1 constitutes a new closed loop formed by the mPD 17, the APC 21, the ATC 9, the TEC driver 13, the TEC 5 and the LD 3. This new closed loop may control the temperature of the LD 3 within a range of ±1° C. by processing the output $Out_4$ of the mPD 17 with a 10-bit A/D-Converter, which has a resolution of 1/1024~0.1%, because the LD 3 has the temperature dependence of −3.5%/° C. in the output thereof. Moreover, since the optical transmitter 1 shown in FIG. 1 outputs the failure in the ATC loop by the signal $Out_3$ to the external unit 25, this failure may be promptly acknowledged even when the temperature control of the TEC 5 is temporarily carried out by the new loop using the mPD 17.

The description above assumes a case where the output $Out_4$ of the mPD 17 is always monitored and revised in the APC 21. In an alteration, the output $Sg_8$ of the comparator 11b may be always monitored. The APC 21 is necessary to prepare a conversion table from the output $Out_4$ of the mPD 17 to the input $Sg_8$ of the LD driver 23 in the former arrangement, this conversion table is unnecessary when the APC 21 directly monitors the input $Sg_8$ of the LD driver 23. When a failure is occurred in the ATC loop, the ATC 21 only holds the input $Sg_8$ for the LD driver 23.

Figure 2:
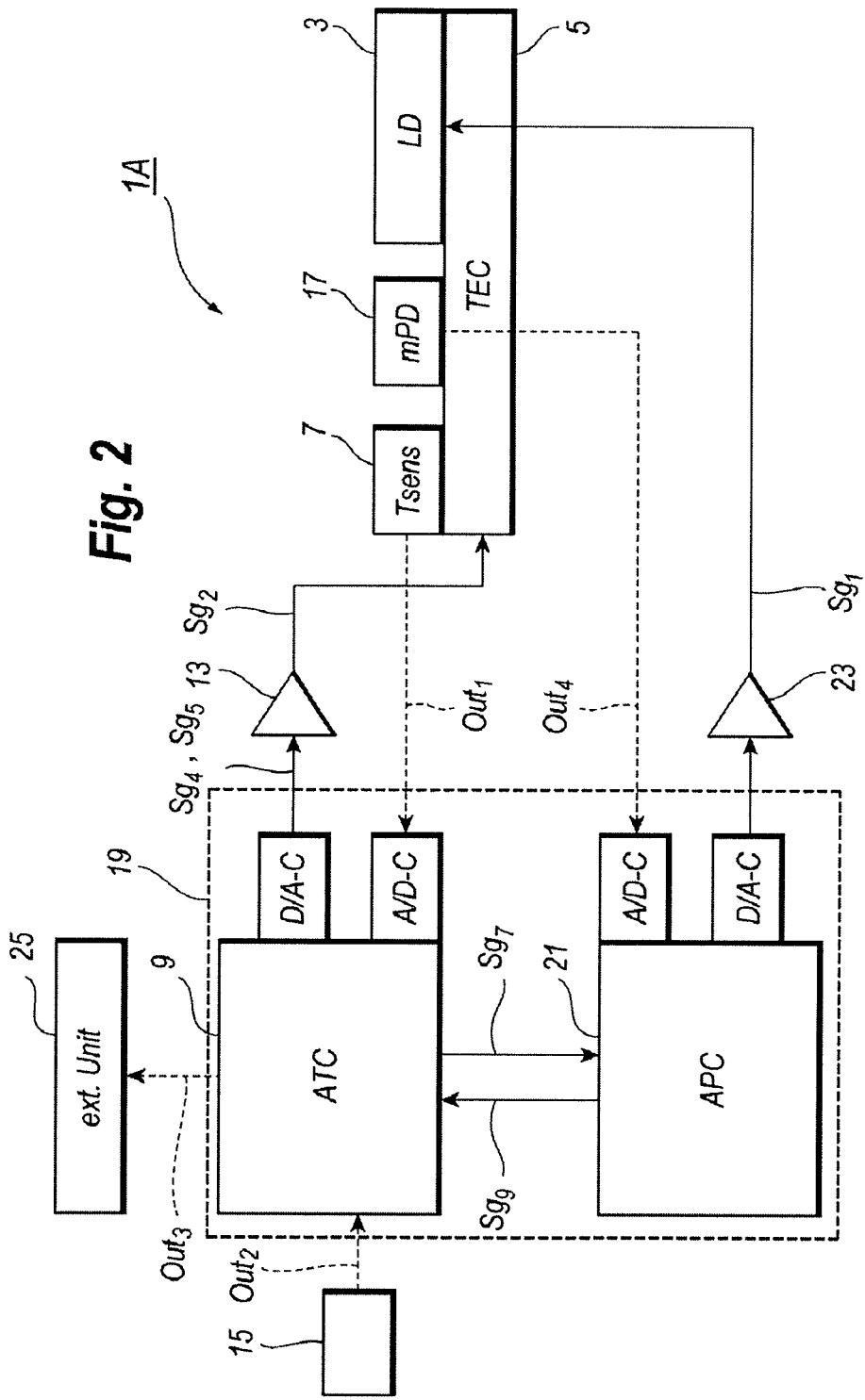
FIG. 2 is a block diagram of the optical transmitter according to the second embodiment of the present invention.

FIG. 2 is a block diagram of another embodiment according to the present invention. The optical transmitter 1 shown in FIG. 1 provides two controllers, 9 and 21, for the ATC loop and the APC loop, respectively; but these controllers may be implemented within a unique processor 19. The response time of the ATC loop scarcely becomes shorter than 1 second. It takes 1 second or more from a moment to provide the signal $Sg_5$ to the TEC driver 13, then adjusting the driving current $Sg_t$ to the TEC 5 by the TEC driver 13, changing the temperature of the TEC 5, and to a moment to detect a practical change of the temperature of the TEC 5 by the temperature sensor 7 or the mPD 17. Thus, the time constant of the ATC loop or the extra loop including the mPD 17 is long enough for the electrical processing. The unique processor 19 may show power to change the switches, 12a and 12b, to output the alarm $Out_3$ to the external unit 25, and to generate the control signal $Sg_4$ based on the output of the mPD 17 within one cycle of the new control loop.

Moreover, the block diagram shown FIG. 1 provides the ATC loop and the APC loop each controlled in the analogue mode including two switches, 12a and 12b. But the optical transmitter 1A shown in FIG. 2 may carry out those operations in the digital mode. In the ATC loop, the output $Out_1$ of the temperature sensor 7 is firstly converted in a digital signal by the A/D-Converter and received by the ATC 9, or the processor 19. The ATC 9, or the processor 19, compares this input digitally with the first reference, generates a digital signal so as to set the difference of these two digital signals to be zero, and provides this digital signal to the TEC driver 13 by converting to an analogue signal, $Sg_5$ or $Sg_4$, by the D/A-Converter. The optical transmitter 1A shown in FIG. 2 has the D/A-Converter within the ATC 9 or the processor 19; this D/A-Converter may be implemented within the TEC driver 13.

The APC loop in the modified optical transmitter 1A converts the output $Out_4$ of the mPD 17 into a digital form, compares this output with the second reference by the APC 21 or the processor 19, and outputs the control signal to the LD driver 23 after the conversion to an analogue signal by the D/A-Converter. This D/A-Converter provided in the output of the APC 21 may be implemented within the LD driver 23. When a failure occurs in the ATC loop, the APC 21 ceases the comparison with the second reference and maintains the control signal provided to the LD driver 23 just before the occurrence of the failure, and passes through the output $Out_4$ of the mPD 17 digitally to the ATC 9. The ATC 9 provides the signal $Sg_5$ based on thus provided output $Out_4$ of the mPD 17 to the TEC driver 13.

Processing the output of the temperature sensor 7 and that of the mPD 17 digitally by the processor 19, a pass for the APC 21 to monitor the output $Out_4$ of the mPD 17 and another pass to provide the output of the APC 21 directly to the LD driver 23 is unnecessary. Similar situation may appear in the ATC loop, that is, a pass to provide the output $Sg_4$ of the ATC 9 directly to the TEC driver 13 is unnecessary.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method to control an optical transmitter that provides an auto-temperature controlling ATC loop including a temperature sensor, a first comparator, a first switch, a TEC driver, a TEC, and a temperature controller to control a temperature of an LD installed within said optical transmitter and an auto-power controlling (APC) loop including a monitor PD, a second comparator, a second switch, an LD driver, said LD, and a power controller to control an optical output of said LD, said method comprising steps of:

setting said APC loop in an open loop mode and said LD in a constant driving condition when said ATC loop becomes extraordinary, by
switching said second switch from a mode in which said LD driver is connected to said second comparator, to another mode in which said LD driver is connected to said power controller, and providing a control signal from said power controller to said LD driver, said control signal corresponding to a driving current provided just before said ATC loop becomes extraordinary providing an output of said monitor PD to said temperature controller; and controlling said temperature of said LD based on said optical output of said LD by switching said first switch from a mode in which said TEC driver is connected to said first comparator, to another mode in which said TEC driver is connected to said temperature-controller, and providing another control signal to said TEC driver from said temperature-controller, said another control signal corresponding to said output of said monitor PD.

2. The method of claim 1, further comprising a step of outputting an error signal to an external unit of said optical transmitter after said step of providing said control signal to said TEC driver.

3. A method to control an optical transmitter installing an LD therein, said optical transmitter providing an auto-temperature controlling (ATC) loop, and an auto-power controlling (APC) loop, said ATC loop including a temperature sensor, a temperature controller, a TEC driver, a TEC, and a temperature controller to control a temperature of said LD, said temperature controller providing a control signal to said TEC driver in an analogue mode by comparing said temperature of said LD sensed by said temperature sensor digitally with a first reference, and said APC loop including a monitor PD, a power controller, an LD driver, and said LD, said power controller providing another control signal to said LD driver in said analogue mode by comparing said optical output of said LD monitored by said monitor PD digitally with a second reference, said method, when said ATC loop becomes extraordinary, comprising the steps of:

setting said APC loop in an open loop mode by ceasing said comparison by said power controller, maintaining said another control signal provided to said LD driver just before said ATC loop becomes extraordinary, and providing said optical output converted in said digital form to said temperature controller; and controlling said temperature of said LD by providing said control signal based on said optical output transferred from said power controller to said TEC driver.

4. The method of claim 3, wherein said steps of ceasing said comparison, maintaining said another control signal, providing said optical output, and providing said control signal are carried out by a unique controller.

5. The method of claim 3, further comprising a step of outputting an error to an external unit of said optical transmitter after said step of providing said control signal to said TEC driver.

6. An optical transmitter including an LD for emitting light and a TEC for controlling a temperature of said LD, comprising:

an auto-temperature controlling (ATC) loop including, a temperature sensor configured to sense said temperature of said LD, a temperature controller configured to output a first control signal that makes said temperature of said LD substantially equal to a target temperature by comparing an output of said temperature sensor with a first reference corresponding to said target temperature, a TEC driver configured to drive said TEC by receiving said first control signal, and said TEC; and an auto-power controlling APC loop including, a monitor PD configured to monitor said light emitted from said LD, a power controller configured to output a second control signal that makes a magnitude of said light substantially equal to a target magnitude by comparing an output of said monitor PD, a LD driver configured to drive said LD by receiving said second control signal, and said LD, wherein, when said temperature sensor becomes extraordinary, said APC loop changes to an open loop mode by driving said LD in a steady condition set just before said temperature sensor becomes extraordinary directly by said power controller, said output of said monitor PD is provided to said temperature controller, and said temperature controller drives said TEC driver based on said output of said monitor PD without comparing said output of said temperature sensor with said first reference.

7. The optical transmitter of claim 6, wherein said temperature controller and said power controller are integrated in a single body.

8. The optical transmitter of claim 6, wherein said temperature controller compares said output of said temperature sensor digitally with said first reference.

9. The optical transmitter of claim 6, wherein said power controller compares said output of said monitor PD digitally with a second reference.

* * * * *